(12) United States Patent
Lynn et al.

(10) Patent No.: US 10,523,249 B2
(45) Date of Patent: Dec. 31, 2019

(54) DIRECTIONAL DUAL-RADIO WIRELESS REPEATER

(71) Applicant: Frontiir PTE Ltd, Singapore (SG)

(72) Inventors: Maung Tun Tun Lynn, Yangon (MM); Tian-Sheng Chen, New Taipei (TW); Godfrey Tan, San Jose, CA (US); Allen Ka Lun Miu, Fremont, CA (US); Tin Htun Aung, Yangon (MM); La Min Ko, Yangon (MM)

(73) Assignee: Frontiir PTE Ltd, Singapore (SG)

( * ) Notice: Subject to any disclaimer, the term of this patent is extended or adjusted under 35 U.S.C. 154(b) by 18 days.

(21) Appl. No.: 15/961,725

(22) Filed: Apr. 24, 2018

(65) Prior Publication Data

US 2019/0089388 A1    Mar. 21, 2019

Related U.S. Application Data

(60) Provisional application No. 62/561,071, filed on Sep. 20, 2017.

(51) Int. Cl.
| | |
|---|---|
| *H04B 1/00* | (2006.01) |
| *H04B 7/0413* | (2017.01) |
| *H04W 88/12* | (2009.01) |
| *H04M 1/02* | (2006.01) |

(52) U.S. Cl.
CPC ......... *H04B 1/0064* (2013.01); *H04B 7/0413* (2013.01); *H04M 1/026* (2013.01); *H04W 88/12* (2013.01)

(58) Field of Classification Search
CPC ... H04B 1/0064; H04B 7/0413; H04M 1/026; H04W 88/12
See application file for complete search history.

(56) References Cited

U.S. PATENT DOCUMENTS

| 9,865,920 B1* | 1/2018 | Kuo | H01Q 5/0034 |
| 9,905,937 B1* | 2/2018 | Chiang | H01Q 21/065 |
| 2010/0113098 A1* | 5/2010 | Riley | H01Q 1/2291 |
| | | | 455/562.1 |

(Continued)

FOREIGN PATENT DOCUMENTS

WO    2016016684 A1    2/2016

OTHER PUBLICATIONS

International Search Report and Written Opinion dated Nov. 28, 2018 for International application No. PCT/US2018/050407.

*Primary Examiner* — Asghar H Bilgrami
(74) *Attorney, Agent, or Firm* — Womble Bond Dickinson (US) LLP

(57) ABSTRACT

A wireless electronic device is provided. The wireless electronic device includes a first antenna and a first transceiver operatively coupled to the first antenna. The first transceiver is configured to receive and transmit data signals of a wireless communications network in a first frequency band. The first antenna is positioned to receive and transmit in a first direction. The wireless electronic device further includes a second antenna and a second transceiver operatively coupled to the second antenna and the first transceiver. The second transceiver is configured to receive and transmit data signals of the wireless communications network in a second frequency band. The second antenna is positioned to receive and transmit in a second direction being opposite to the first direction.

16 Claims, 8 Drawing Sheets

(56) References Cited

U.S. PATENT DOCUMENTS

| | | | |
|---|---|---|---|
| 2013/0321240 A1* | 12/2013 | O'Shea | H01Q 21/28 343/893 |
| 2014/0362729 A1* | 12/2014 | Michaud | H04W 16/26 370/254 |
| 2014/0368400 A1 | 12/2014 | Lin et al. | |
| 2016/0285174 A1 | 9/2016 | Chistyakov et al. | |
| 2018/0175515 A1* | 6/2018 | Boutayeb | H01Q 21/245 |

\* cited by examiner

Omni Directional Antenna

Directional Antenna

DIRECTIONAL DUAL-RADIO WIRELESS REPEATER

The application claims to the benefit of U.S. Provisional Patent Application No. 62/561,071, filed Sep. 20, 2017, the entire contents of which are hereby incorporated by reference.

TECHNICAL FIELD

Aspects of the present disclosure relate to a wireless electronic device, and more particularly, to a directional dual-radio repeater wireless electronic device.

BACKGROUND

Transmitters and receivers, or when coupled together as part of a single unit, "transceivers," are commonly included in various electronic devices, and particularly, portable electronic devices such as phones (e.g., mobile and cellular phones, cordless phones, personal assistance devices), computers (e.g., laptops, tablet computers), internet connectivity devices (e.g., routers, bridges, repeaters, modems, and so forth), radios, televisions, or any of various other stationary or mobile electronic devices. Certain types of transceivers, known as wireless transceivers, may be used to generate and receive wireless signals to be transmitted and/or received by way of an antenna coupled to the transceiver. Specifically, the wireless transceiver is generally used to wirelessly communicate data over one or more network channels or other medium (e.g., air) to and from one or more external wireless electronic devices. For example, these transceivers may be included in various mobile and in-home wireless electronic devices, and particularly mobile and in-home wireless electronic devices that may support wireless applications such as, for example, Bluetooth™, Wireless Fidelity (Wi-Fi™), ZigBee™, Long Term Evolution (LTE™) cellular, and so forth.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
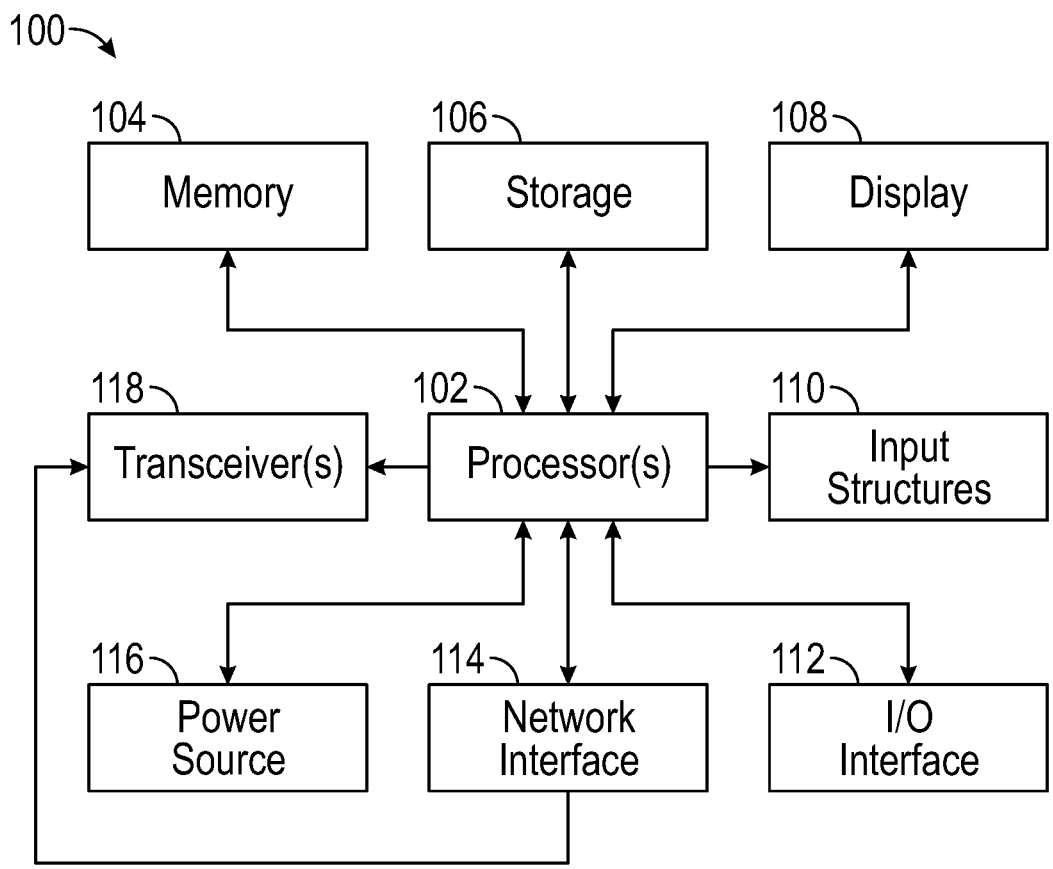
FIG. 1 is a block diagram illustrating one or more components that may be included in a wireless electronic device, in accordance with the present embodiments.

Embodiments of the present disclosure relate to a dual-radio repeater wireless electronic device that may be used to support Wi-Fi™ wireless applications concurrently operating in the 2.4 GHz frequency band and the 5.8 GHz frequency band. In certain embodiments, the dual-radio repeater wireless electronic device may include, for example, a number of multiple input multiple output (MIMO) antennas coupled to a first transceiver operating in the 2.4 GHz frequency band and a second transceiver operating in the 5.8 GHz frequency band, respectively. In accordance with the present embodiments, the first transceiver operating in the 2.4 GHz frequency band and the associated antennas may be positioned with respect to the dual-radio repeater wireless electronic device to radiate RF energy into a direction opposite (e.g., separated by 180°) that of the second transceiver operating in the 5.8 GHz frequency band and associated antennas. Specifically, the antennas coupled to the first transceiver operating in the 2.4 GHz frequency band may be positioned, for example, at an end of the dual-radio repeater wireless electronic device that is opposite the end of the dual-radio repeater wireless electronic device at which the second transceiver operating in the 5.8 GHz frequency band is positioned.

In certain embodiments, the MIMO antennas may include one or more directional antennas (e.g., one or more high-gain wireless antennas configured to direct RF energy into a particular direction and to reduce RF energy radiation into the other directions) to reduce possible occurrence of interference (e.g., spurious signal interference, OOB noise, or other possible EMI) between the first transceiver operating at 2.4 GHz and the second transceiver operating at 5.8 GHz. Further, in certain embodiments, the antenna feedlines utilized to provide signals to the directional antennas coupled to the first transceiver operating at 2.4 GHz may be constructed according to a particular determined trace pattern, while the antenna feedlines utilized to provide signals to the directional antennas coupled to the second transceiver operating at 5.8 GHz may be constructed according to another particular determined trace pattern. Specifically, the trace patterns of the respective antenna feedlines may be determined and constructed in such a manner that will further reduce possible occurrence of interference (e.g., spurious signal interference, OOB noise, or other possible EMI) between the first transceiver operating in the 2.4 GHz frequency band and the second transceiver operating in the 5.8 GHz frequency band.

In another embodiment, the dual-radio repeater wireless electronic device may also include a mounting component useful in allowing the dual-radio repeater wireless electronic device to be vertically mounted on either side of the dual-radio repeater wireless electronic device. For example, in some embodiments, the mounting component may include one or more individual subcomponents including mounting holes on opposite sides of the subcomponents of the mounting component. In other embodiments, the mounting component 700 may include utilizing any of various techniques to vertically mount the dual-radio repeater wireless electronic device, including, for example, adhesive mounting components, Velcro™ mounting components, magnetic mounting components, suspension mounting components, and so forth.

A general description of an electronic device that may employ dual transceivers and opposite-facing directional antennas useful in concurrently supporting Wi-Fi™ wireless applications operating in different frequency bands is provided below. Turning first to FIG. 1, an electronic device 100 according to an embodiment of the present disclosure may include, among other things, one or more processor(s) 102, memory 104, nonvolatile storage 106, a display 108, input structures 110, an input/output (I/O) interface 112, network interfaces 114, a power source 116, and one or more transceiver(s) 118. The various functional blocks shown in FIG. 1 may include hardware elements (including circuitry), software elements (including computer code stored on a computer-readable medium), or, in some embodiments, a combination of both hardware and software elements. It should be noted that FIG. 1 is merely one example of a particular implementation and is intended to illustrate the types of components that may be present in the electronic device 100.

By way of example, the electronic device 100 may represent a block diagram of a wireless repeater electronic device, a wireless bridging electronic device, a wireless router electronic device, or other similar wireless electronic device that may be used to, for example, regenerate and/or boost RF signals to extend the range of a WLAN (e.g., Wi-Fi™ network). It should be noted that the processor(s) 102 and/or other computer processing circuitry that may be included in the electronic device 100 may be generally referred to herein as "processing devices." Such processing devices may be embodied wholly or in part as software, firmware, hardware, or some combination thereof. Furthermore, the processing device may be a single contained processing device or may be incorporated wholly or partially within any of the other elements within the electronic device 100.

In the electronic device 100 of FIG. 1, the processor(s) 102 and/or other processing devices may be operably coupled with the memory 104 and the nonvolatile memory 106 to perform various algorithms. Such programs or instructions executed by the processor(s) 102 may be stored in any suitable article of manufacture that includes one or more tangible, computer-readable media at least collectively storing the instructions or routines, such as the memory 104 and the nonvolatile storage 106. The memory 104 and the nonvolatile storage 106 may include any suitable articles of manufacture for storing data and executable instructions, such as random-access memory, read-only memory, rewritable flash memory, hard drives, and optical discs. Additionally, programs (e.g., an operating system) encoded on such a computer program product may also include instructions that may be executed by the processor(s) 102 to allow the electronic device 100 to provide various functionalities. In certain embodiments, the display 108 may include one or more light-emitting diode (LED) indicators useful in providing indicators (e.g., power indicator, connectivity indicator, and so forth). As further illustrated, the electronic device 100 may also include a power source 116. The power source 116 may include any suitable source of power, such as a rechargeable lithium polymer (Li-poly) battery and/or AC power source.

The input structures 110 of the electronic device 100 may allow a user, for example, to interact with the electronic device 100 (e.g., pressing a button to power-ON or power-OFF). Similarly, the I/O interface 112 may allow electronic device 100 to interface with various other electronic devices, such as one or more peripheral electronic devices. The network interfaces 114 may include, for example, interfaces for a personal area network (PAN), such as a Bluetooth™ network, for a local area network (LAN) or wireless local area network (WLAN), such as an 802.11x Wi-Fi™ network, and/or for a wide area network (WAN), such as a $3^{rd}$ generation (3G) cellular network, $4^{th}$ generation (4G) cellular network, a $5^{th}$ generation (5G) cellular network, or long term evolution (LTE™) licensed (e.g., LTE-LAA™) or unlicensed (e.g., LTE™-U) cellular network. The network interface 26 may also include interfaces for, for example, broadband fixed wireless access networks (WiMAX™), mobile broadband Wireless networks (mobile WiMAX™), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, to allow the electronic device 100 to communicate over the aforementioned wireless networks (e.g., Wi-Fi™, WiMAX, mobile WiMAX, 5G, LTE™, and so forth), the electronic device 100 may include one or more transceiver(s) 118. The transceiver(s) 118 may include any circuitry the may be useful in both wirelessly receiving and wirelessly transmitting signals (e.g., data signals). Indeed, in some embodiments, as will be further appreciated, the transceiver(s) 118 may include dual transmitters and dual receivers combined into single units (e.g., "transceivers") operating in different frequency bands. For example, as noted above, the transceiver(s) 118 may transmit and receive data signals to support data communication in wireless applications such as, for example, PAN networks (e.g., Bluetooth™), WLAN networks (e.g., 802.11x Wi-Fi™), WAN networks (e.g., 3G, 4G, LTE™, 5G, LTE™-LAA, LTE™-U cellular networks), WiMAX networks, mobile WiMAX networks, ADSL and VDSL networks, DVB-T and DVB-H networks, UWB networks, and so forth.

In many instances, the support of the aforementioned wireless applications may depend on the electronic device 100 achieving excellent signal reception and transmission quality. Particularly, the signal reception and transmission quality of the electronic device 100 may, at least in some instances, be dependent upon the efficiency and the configuration of the transceiver(s) 118, operating frequency, and the direction and/or the location of one or more antennas included as part of the electronic device 100. Indeed, in some instances, the same electronic device 100 may be required to support multiple wireless internet applications (e.g., Wi-Fi™ applications or other wireless local area network [WLAN] applications) each operating within the same frequency band or different frequency bands. Specifically, while certain domestic Wi-Fi™ wireless applications may, in many instances, operate in the 2.4 gigahertz (GHz) industrial, scientific, and medical (ISM) frequency band, other large-scale, commercial-grade Wi-Fi™ wireless applications may operate in the 5.8 GHz ISM frequency band.

For example, in one instance, the electronic device 100 may be used as a repeater in, for example, an urban area in which a Wi-Fi™ internet or call service includes access-point infrastructure operating in the 5.8 GHz frequency band installed along streets of the urban area. The same electronic device 100 may, concurrently, be used to communicate (e.g., via bridging and repeating) Wi-Fi™ internet or call service operating in a 2.4 GHz frequency into service subscribers' dwellings. However, concurrently supporting 2.4 GHz and 5.8 GHz Wi-Fi™ applications may markedly degrade the reception and transmission radio frequency (RF) data signals due to, for example, spurious RF signal interference, out-of-band (OOB) noise, or other possible electromagnetic interference (EMI). Additionally, utilizing, for example, omnidirectional antennas in such Wi-Fi™ applications may further exacerbate the possible occurrence of EMI. It may thus be useful to provide a robust directional, dual-radio repeater wireless electronic device that may be utilized to support concurrent Wi-Fi™ applications operating in different frequency bands.

Figure 2:
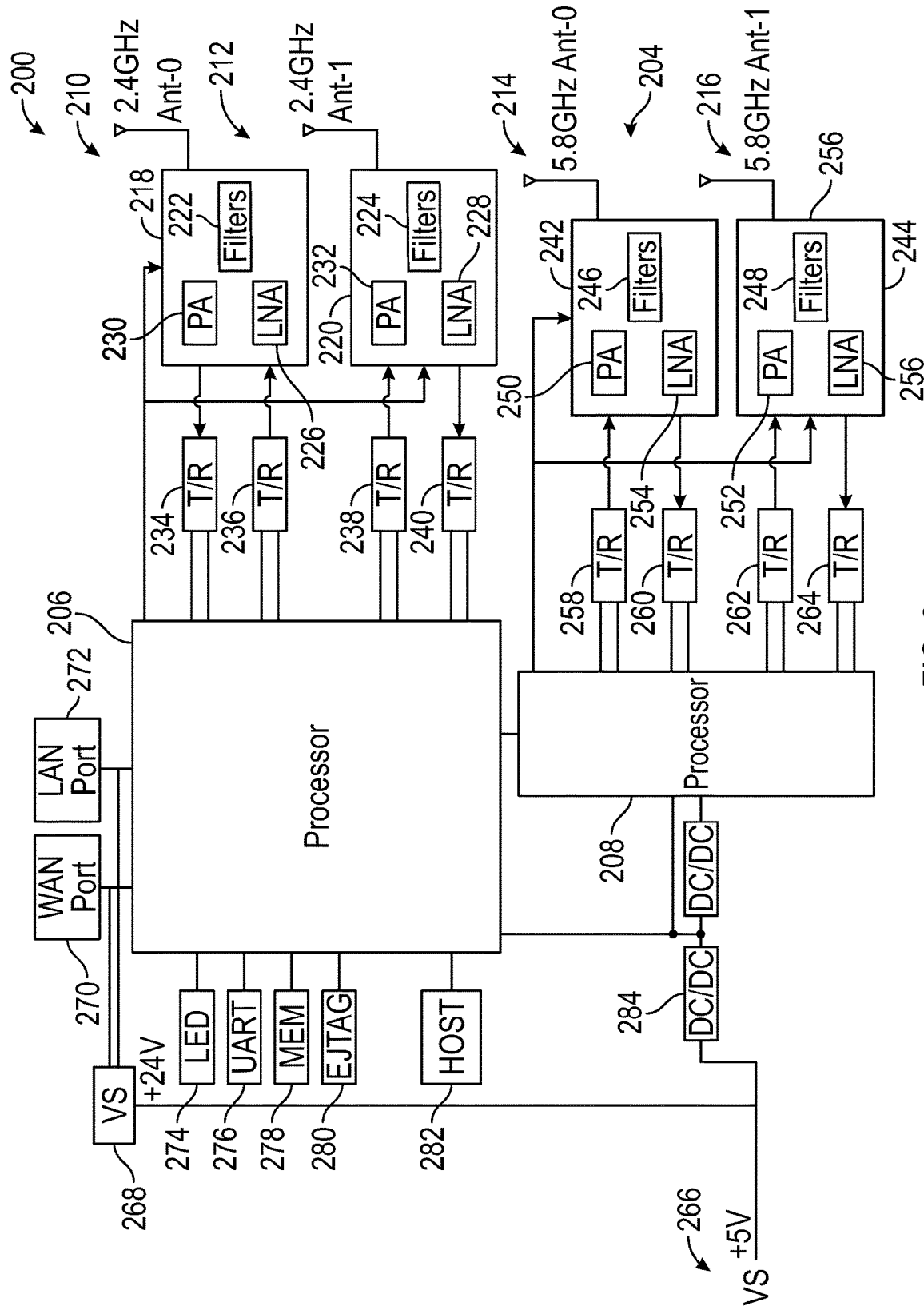
FIG. 2 is a block diagram illustrating a directional dual-radio repeater wireless electronic device, in accordance with the present embodiments.

Turning now to FIG. 2, a detailed illustration of a dual-radio repeater wireless electronic device 200 in accordance with the present embodiments is depicted. As depicted, the dual-radio repeater wireless electronic device 200 may include a first transceiver 202 and a second transceiver 204. In certain embodiments, the first transceiver 202 may be configured to operate in the 2.4 GHz frequency band, while the second transceiver 204 may be configured to operate in the 5.8 GHz frequency band. Specifically, in accordance with the present embodiments, the first transceiver 202 may be utilized to connect one or more end users to 2.4 GHz internet service data (e.g., Wi-Fi™ service into service subscribers' dwellings), while, concurrently, the second transceiver 204 may be utilized to backhaul 5.8 GHz Wi-Fi™ data traffic to the internet (e.g., to Wi-Fi™ service-provider access-point infrastructure).

As further depicted, the first transceiver 202 and the second transceiver 204 may be electrically coupled to each other, and may include respective processing devices 206 and 208. In some embodiments, the respective processing devices 206 and 208 may each include a baseband processor (BBP) or any of various other RF processing devices that may be used to manage the RF processing and functions of Wi-Fi™ data signals received from and/or transmitted to, respective 2.4 GHz antennas 210 and 212 and 5.8 GHz antennas 214 and 216. As illustrated, the antennas 210, 212, 214, and 216 may include multiple input multiple output [MIMO] antennas in which antennas 210 and 214, for example, may operate on one input/output (I/O) channel (e.g., channel 0) and the antennas 212 and 216 may operate on another I/O channel (e.g., channel 1). In certain embodiments, the antennas 210, 212, 214, and 216 may each include, for example, one or more directional antennas (e.g., Yagi directional antenna, helical directional antenna) that may be used to generate and direct one or more high-gain RF beams into a particular direction and to reduce RF energy radiation into other directions.

As further depicted in FIG. 2, during operation of the first transceiver 202, for example, the first transceiver 202 may process RF signals (e.g., 2.4 GHz Wi-Fi™ data signals) detected by or transmitted to the antennas 210 and 212. The RF signals (e.g., 2.4 GHz Wi-Fi™ data signals) may be passed to one or more components 218, 220 for further processing. For example, the components 218, 220 may include one or more power amplifiers (PA) 218, 220 (e.g., used to amplify 2.4 GHz Wi-Fi™ data signals to be transmitted). The filters 222, 224 may include any of various devices that may be useful in allowing desired frequencies to pass, for example, from the antennas 210 and 212 to the processing device 206, and disallowing undesired frequencies or other harmonics from passing from the antennas 210 and 212 to the processing device 206. The components 218, 220 may also include one or more low noise amplifiers (LNAs) 226, 228 (e.g., used to amplify received 2.4 GHz Wi-Fi™ data signals). As further depicted, RF signals (e.g., Wi-Fi™ data signals) may also be passed to one or more transmitter/receiver (T/R) switches 234, 236, 238, 240 or other circulator devices, which may be useful in routing signals to be transmitted from the antennas 210, 212 (e.g., during transmission of 2.4 GHz Wi-Fi™ data signals), and routing signals received via the antennas 210, 212 (e.g., during reception of 2.4 GHz Wi-Fi™ data signals).

Operating concurrently, the second transceiver 204, for example, may process RF signals (e.g., 5.8 GHz Wi-Fi™ data signals) detected by the antennas 214 and 216. The received RF signals (e.g., 5.8 GHz Wi-Fi™ data signals) may be then passed to one or more components 242, 244 for further processing. For example, the components 242, 244 may include one or more power amplifiers (PA) 250, 252 (e.g., used to amplify 5.8 GHz Wi-Fi™ data signals to be transmitted). The filters 246, 248 may include any of various devices that may be useful in allowing desired frequencies to pass, for example, from the antennas 214 and 216 to the processing device 208, and disallowing undesired frequencies or other harmonics from passing from the antennas 214 and 216 to the processing device 208. The components 242, 244 may also include one or more LNAs 254, 256 (e.g., used to amplify received 5.8 GHz Wi-Fi™ data signals). As further depicted, RF signals (e.g., 5.8 GHz Wi-Fi™ data signals) may also be passed to one or more T/R switches 258, 260, 262, 264 or other circulator devices, which may be useful in routing signals to be transmitted from the antennas 214, 216 (e.g., during transmission of 5.8 GHz Wi-Fi™ data signals), and routing signals received via the antennas 214, 216 (e.g., during reception of 5.8 GHz Wi-Fi™ data signals).

In certain embodiments, as further depicted in FIG. 2, the processing devices 206, 208 may also include a number of input components such as a WAN port 270, LAN port 272, LED indicator 274, a universal asynchronous receiver-transmitter (UART) 276 component, onboard memory 278, an EJTAG component 280, and a host component 282 that may each be included to support intra-system data communication and processing. As further depicted, the processing devices 206 and 208 may be powered via one or more voltage sources (VS) 268 and 270, which may be stepped up (e.g., boosted) or stepped down (e.g., bucked) via direct current (DC)/DC converters 284 and 286.

In certain embodiments, as previously discussed above, the dual-radio repeater wireless electronic device 200 that may be used to support Wi-Fi™ wireless applications concurrently operating in the 2.4 GHz frequency band and the 5.8 GHz frequency band. In certain embodiments, the first transceiver 202 and the antennas 210 and 212 operating in the 2.4 GHz frequency band may be positioned with respect to the dual-radio repeater wireless electronic device 200 to receive and/or transmit RF signals (e.g., 2.4 GHz Wi-Fi™ data signals) into a direction opposite (e.g., separated by 180°) that of the second transceiver 204 and antennas 214 and 216 operating in the 5.8 GHz frequency band.

Specifically, the antennas 210 and 212 coupled to the first transceiver 202 operating in the 2.4 GHz frequency band may be positioned, for example, at a specific end of the dual-radio repeater wireless electronic device 200 and facing a specific direction (e.g., directed toward Wi-Fi™ service subscribers' dwellings or other end user client devices) that is opposite the end of the dual-radio repeater wireless electronic device 200 at which the antennas 214 and 216 coupled the second transceiver 204 operating in the 5.8 GHz frequency band is positioned and directed (e.g., directed toward Wi-Fi™ service-provider access-point infrastructure or other publisher server device). In this way, possible occurrence of interference (e.g., spurious signal interference, OOB noise, or other possible EMI) between the first transceiver operating in the 2.4 GHz frequency band and the second transceiver operating in the 5.8 GHz frequency band may be markedly reduced.

In certain embodiments, to further reduce possible occurrence of interference (e.g., spurious signal interference, OOB noise, or other possible EMI) between the first transceiver operating in the 2.4 GHz frequency band and the second transceiver operating in the 5.8 GHz frequency band, the antenna feedlines utilized to provide signals to the antennas 210 and 212 (e.g., MIMO directional antennas) coupled to the first transceiver operating at 2.4 GHz may be constructed according to a particular determined trace pattern. The antenna feedlines utilized to provide signals to the antennas 214 and 216 (e.g., MIMO directional antennas) coupled to the second transceiver operating at 5.8 GHz may be constructed according to another particular determined trace pattern.

Figure 3A:
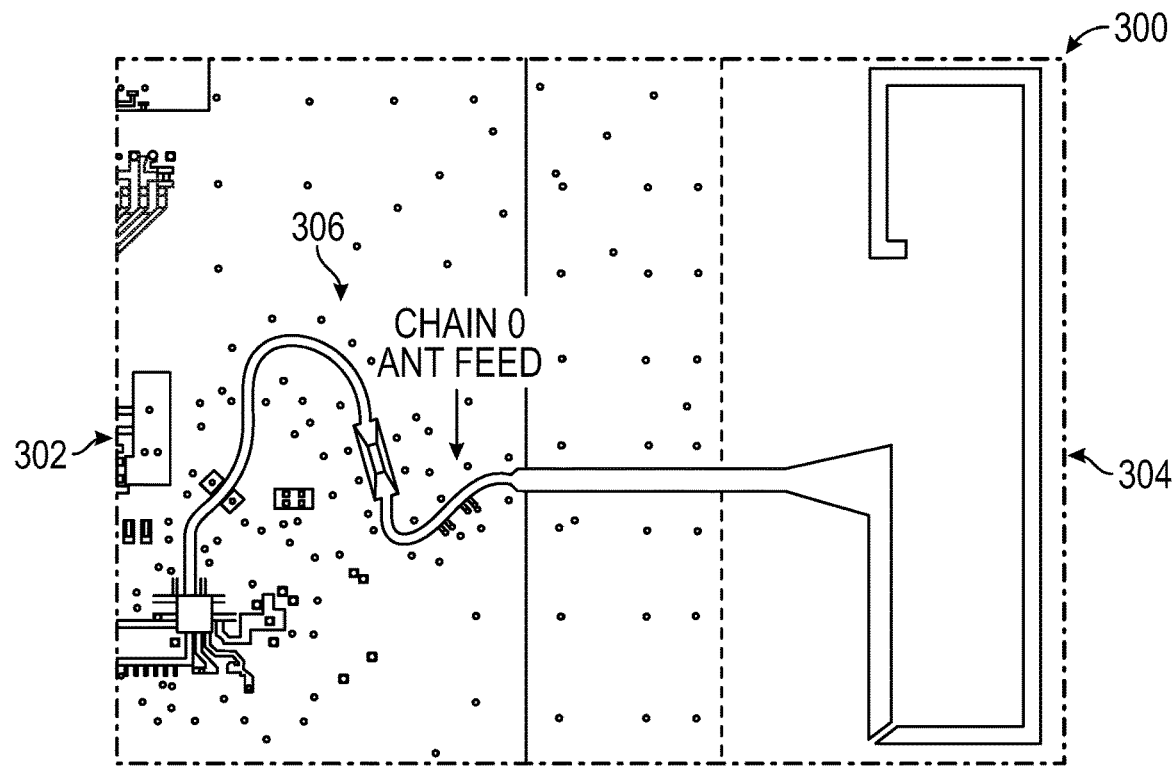
FIG. 3A is a block diagram illustrating a first antenna element of a wireless electronic device, in accordance with the present embodiments.
Figure 3B:
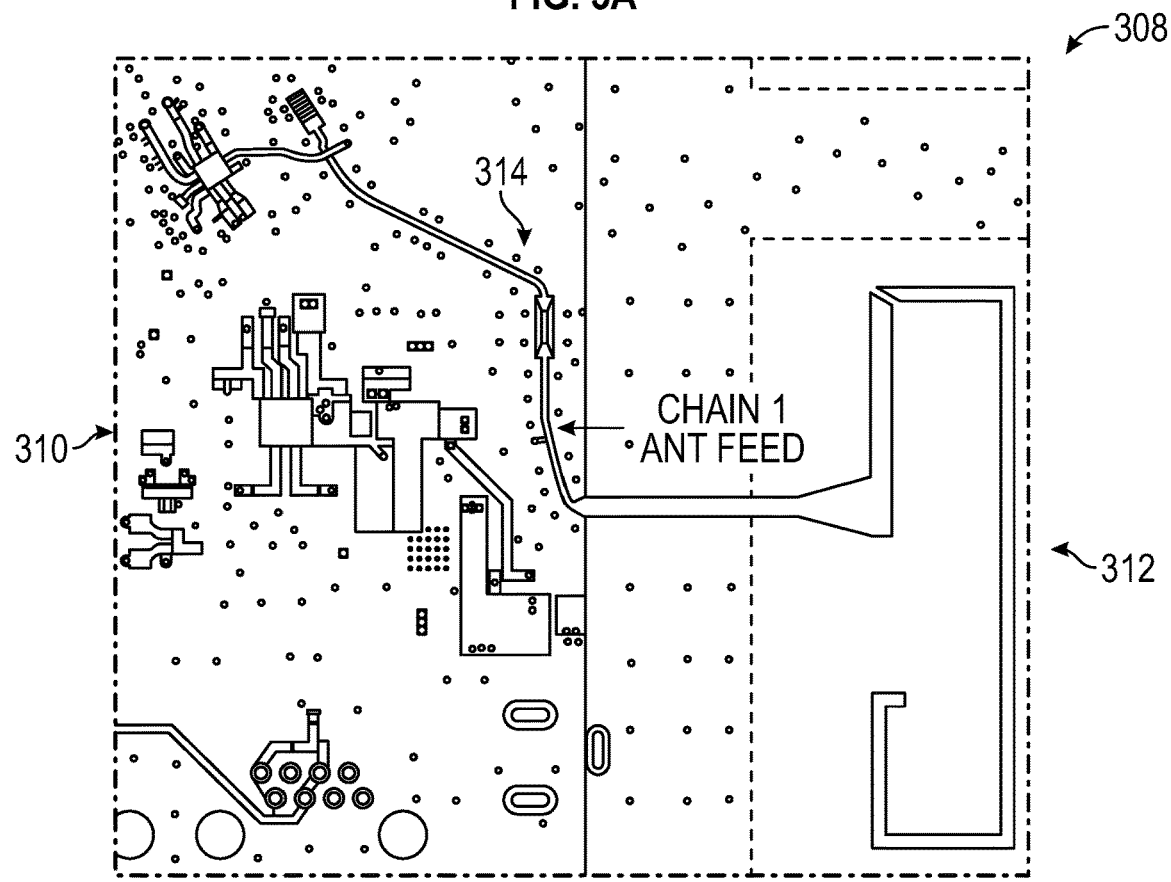
FIG. 3B is a block diagram illustrating a second antenna element of a wireless electronic device, in accordance with the present embodiments.

For example, referring now to FIGS. 3A and 3B, FIG. 3A illustrates one of the antenna channels 300 (e.g., channel 0) of the first transceiver operating in the 2.4 GHz frequency band, while FIG. 3B illustrates another one of the antenna channels 308 (e.g., channel 1) of the first transceiver operating in the 2.4 GHz frequency band. It should be appreciated that the antenna channel 300 of FIG. 3A and the antenna channel 308 of FIG. 3B are included herein as merely an example, and, in implementation, the antenna channel 300 of FIG. 3A and the antenna channel 308 of FIG. 3B may include any number of passive-element and active-element electronic components not illustrated in FIG. 3A and FIG. 3B.

As depicted, FIG. 3A illustrates a substrate 302 on which an antenna element 304 and antenna feedline 306 may be fabricated. Similarly, FIG. 3B illustrates a substrate 310 on which an antenna element 312 and antenna feedline 314 may be fabricated. As used herein, a "substrate" or a "device substrate" may refer to a finite structure (e.g., physical structure having a at least first end portion and second end portion) that physically secures in place, for example, electronic circuit components and printed conductive materials and further provides electrical insulation between each conductive part or component fabricated on the structure. Furthermore, a "substrate" or a "device substrate" may, in some embodiments, refer to any semiconductor material on which, for example, one or more electrical, electronic, magnetic, or electrochemical materials or components may be fabricated and/or implanted thereon. Still further, a "substrate" or a "device substrate" may refer to a semiconductor breadboard that may be utilized to construct a printed circuit board (PCB), which may be included in various end user electronic devices such as, for example, a directional, dual-radio wireless repeater electronic device as disclosed herein.

As illustrated, the antenna feedline 306 and the antenna feedline 314 may each be constructed according to a determined trace pattern. Specifically, the trace patterns of the antenna feedline 306 and the antenna feedline 314 may each be determined and constructed in such a manner that will reduce possible occurrence of interference (e.g., spurious signal interference, OOB noise, or other possible EMI) between the first transceiver operating in the 2.4 GHz frequency band and the second transceiver operating in the 5.8 GHz frequency band. For example, the antenna feedline 306 and the antenna feedline 314 may be traced according to one or more shaped curves that evade or avoid certain other components (e.g., passive-element and/or active-element electronic components or devices) that may be fabricated on the respective substrates 302 and 310 and that may be susceptible to EMI coupling with the antenna feedline 306 and the antenna feedline 314. The determined and constructed trace patterns of the antenna feedline 306 and the antenna feedline 314 may further reduce possible occurrence of interference (e.g., inter-channel interference [ICI]) that may occur between, for example, the antenna channel 300 (e.g., channel 0) and the antenna channel 308 (e.g., channel 1) of the first transceiver operating in the 2.4 GHz frequency band.

For example, as depicted in FIGS. 3A and 3B, the antenna feedline 306 and the antenna feedline 314 may each trace a differently shaped curve (e.g., the illustrated antenna feedline 306 being formed according to an arching or looping shape pattern, while the illustrated antenna feedline 314 being formed according to a sloping pattern) to improve RF isolation between the antenna channel 300 (e.g., channel 0) and the antenna channel 308 (e.g., channel 1) of the first transceiver operating in the 2.4 GHz frequency band, and may thus reduce ICI interference. The respective lengths of the antenna feedline 306 and the antenna feedline 314 may be constructed to be equal to ensure, for example, the same propagation delay across the antenna feedline 306 and the antenna feedline 314 into and out of the antenna channel 300 (e.g., channel 0) and the antenna channel 308 (e.g., channel 1) of the first transceiver operating in the 2.4 GHz frequency band (e.g., propagation delay matching).

Figure 4:
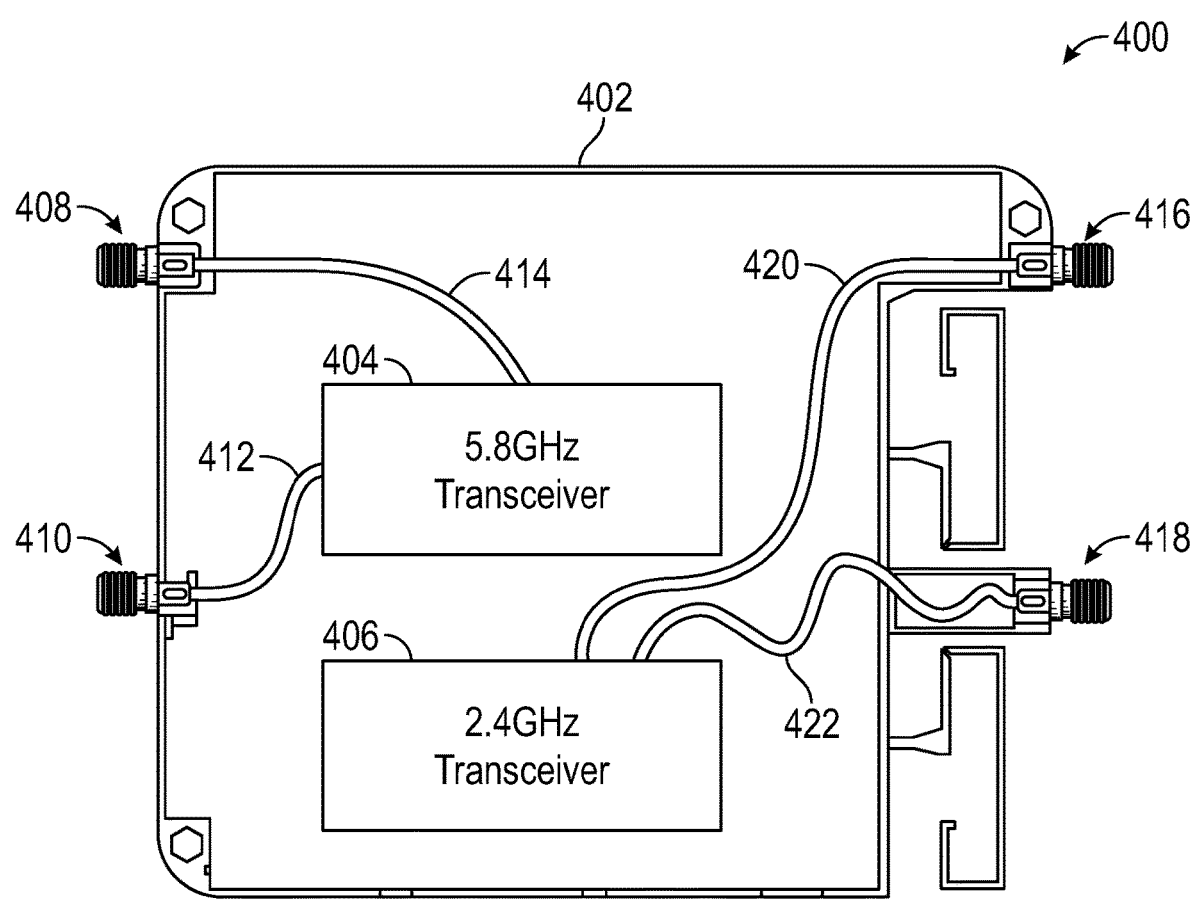
FIG. 4 is a block diagram illustrating substrate including antenna feedlines and ports, in accordance with the present embodiments.

FIG. 4 illustrates a simplified schematic diagram of a dual-radio repeater wireless electronic device 400, in accordance with the present embodiments. As depicted, the dual-radio repeater wireless electronic device 400 may include a substrate 402 on which a 5.8 GHz transceiver 404 and a 2.4 GHz transceiver 406 may be fabricated. In one embodiment, the substrate 402 may include, for example, a PCB or other substrate on which a number of passive-element and active-element electronic devices or components comprising the 5.8 GHz transceiver 404 and the 2.4 GHz transceiver 406 may be fabricated. As depicted, the 5.8 GHz transceiver 404 may be coupled to a number of antenna ports 408 and 410 via antenna feedlines 412 and 414.

In certain embodiments, the antenna ports 408 and 410 may include one or more input structures (e.g., connectors) by which the 5.8 GHz transceiver 404 may couple to one or more antennas (e.g., MIMO directional antennas). As illustrated, and as previously discussed, the antenna ports 408 and 410 may be constructed on an end of substrate 402 that is the opposite end at which, for example, the antenna ports 416 and 418 coupled to the 2.4 GHz transceiver 406 via the antenna feedlines 420 and 422. That is, in at least some embodiments, the antenna ports 408 and 410 corresponding to the 5.8 GHz transceiver 404 and the antenna ports 416 and 418 corresponding to the 2.4 GHz transceiver 406, and, by extension, the antennas to be coupled thereto may be configured in opposite directions (e.g., separated by 180°) to maximize RF signal intensity into the respective directions by the 5.8 GHz transceiver 404 and the 2.4 GHz transceiver 406. In this way, possible occurrence of interference (e.g., spurious signal interference, OOB noise, or other possible EMI) between the 5.8 GHz transceiver 404 and in the 2.4 GHz transceiver 406 may be markedly reduced.

In certain embodiments, as further illustrated, the antenna feedlines 412 and 414 may each be formed according to determined trace patterns (e.g., the illustrated antenna feedline 412 being formed according to a sloping pattern, while the illustrated antenna feedline 414 being formed according to an L-shape pattern) to reduce possible occurrence of ICI between, for example, the antenna ports 408 and 410. Specifically, the antenna feedlines 412 and 414 may be traced according to one or more shaped curves that evade or avoid certain other components (e.g., passive-element and/or active-element electronic components or devices) that may be fabricated on the substrate 402 and susceptible to EMI coupling with the antenna feedlines 412 and 414. The respective lengths of the antenna feedlines 412 and 414 may also be constructed to be equal to ensure, for example, the same propagation delay across the antenna feedlines 412 and 414 with respect to the 2.4 GHz transceiver 406 (e.g., propagation delay matching).

Similarly, the antenna feedlines 420 and 422 may each be formed according to determined trace patterns (e.g., the illustrated antenna feedline 420 being formed according to an S-shape pattern, while the illustrated antenna feedline 422 being formed according to an sinusoidal pattern) to reduce possible occurrence of ICI between, for example, the antenna ports 416 and 418. For example, as previously noted with respect to the antenna feedlines 412 and 414, the antenna feedlines 420 and 422 may be traced according to one or more shaped curves that evade or avoid certain other components (e.g., passive-element and/or active-element electronic devices or components) that may be fabricated on the substrate 402 and susceptible to EMI coupling with the antenna feedlines 420 and 422. It should be appreciated that the determined trace patterns of the antenna feedlines 412, 414, 420, and 422 depicted in FIG. 4 are merely included for the purpose of illustration. In other embodiments, the determined trace patterns may include any of various trace patterns determined and constructed in such a manner that will best reduce possible occurrence of interference (e.g., spurious signal interference, OOB noise, or other possible EMI). The respective lengths of the antenna feedlines 420 and 422 may also be constructed to be equal to ensure, for example, the same propagation delay across the antenna feedlines 420 and 422 with respect to the 5.8 GHz transceiver 404 (e.g., propagation delay matching).

Figure 5A:
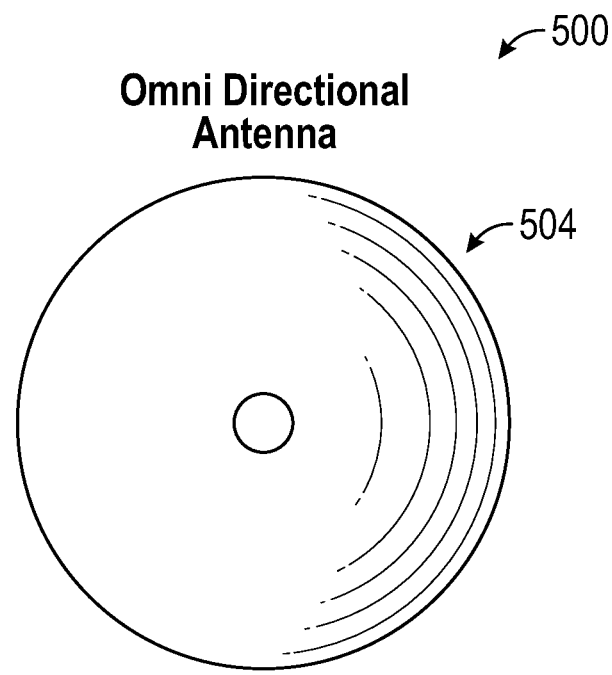
FIG. 5A is a diagram illustrating an omnidirectional antenna radiation pattern, in accordance with the present embodiments.
Figure 5B:
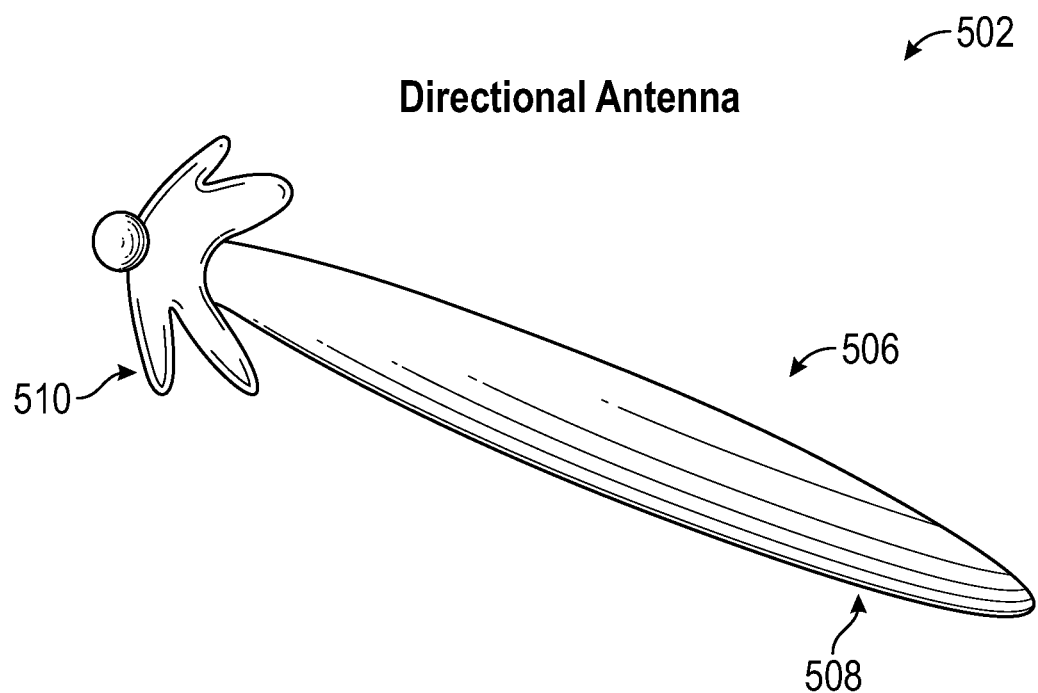
FIG. 5B is a diagram illustrating a directional antenna radiation pattern, in accordance with the present embodiments.

FIGS. 5A, 5B, 6A, 6B illustrate examples and technical advantages of the foregoing techniques. For example, FIGS. 5A and 5B compare the radiation pattern of, for example, a wireless electronic device employing omnidirectional antennas with the radiation pattern of, for example, a directional, dual-radio repeater wireless electronic device employing directional antennas as described herein (e.g., as discussed above with respect FIG. 2). As depicted, the diagram 500 of FIG. 5A illustrates an omnidirectional antenna radiation pattern 504, which may include, for example, a radial radiation pattern in which RF energy is radiated equally in all directions. On the hand, the diagram 502 of FIG. 5B illustrates a directional antenna radiation pattern 506, which includes a main lobe 508 carrying the bulk of the radiated RF energy into a particular direction while reducing RF energy being radiated into other directions as illustrated by the side lobes 510.

Figure 6A:
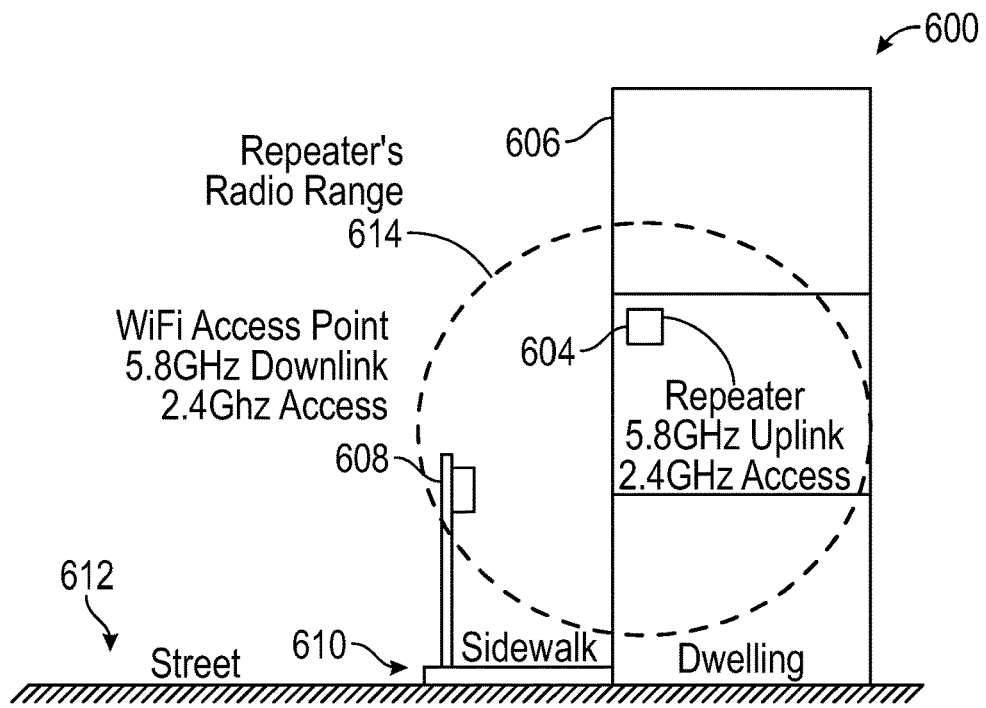
FIG. 6A is a block diagram illustrating a coverage range of a wireless electronic device including an omnidirectional antenna, in accordance with the present embodiments.
Figure 6B:
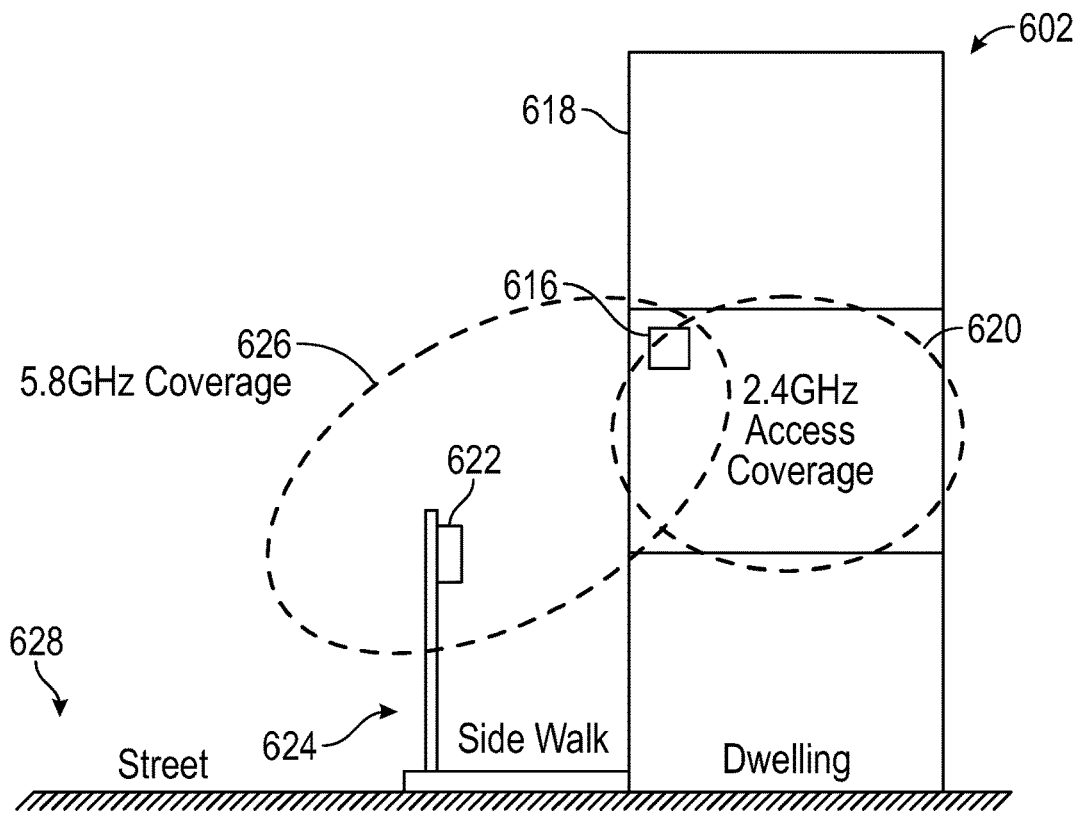
FIG. 6B is a block diagram illustrating a coverage range of a wireless electronic device including a directional antenna, in accordance with the present embodiments.

Similarly, FIGS. 6A and 6B compare the coverage range of, for example, a diagram 600 including a wireless electronic device (e.g., repeater) employing omnidirectional antennas with the coverage range of, for example, a diagram 602 including a directional, dual-radio repeater wireless electronic device employing the techniques described herein (e.g., as discussed above with respect FIG. 2). FIG. 6A includes an example wireless electronic device 604, which may be deployed inside of a dwelling 606 (e.g., a house, apartment, loft, etc.). The wireless electronic device 604 may be in communication with an access point electronic device 608 that may be deployed, for example, along a sidewalk 610 or a street 612. As illustrated, the wireless electronic device 604 may include, for example, a radial coverage range 614. Moreover, the respective radiation patterns of the wireless electronic device 604 and the access point electronic device 608 may overlap and interfere with each other, and thus each have decreased RF signal intensity.

On the other hand, FIG. 6B includes an example directional, dual-radio repeater wireless electronic device 616 as described above in accordance with the present techniques. The directional, dual-radio repeater wireless electronic device 616 may be deployed inside of a dwelling 618, and may be in communication with an access point electronic device 622. The access point electronic device 622 may be deployed, for example, along a sidewalk 624 or a street 628. As illustrated, the directional, dual-radio repeater wireless electronic device 616 may include, for example, a first coverage range 620 (e.g., corresponding to a first transceiver in the directional, dual-radio repeater wireless electronic device 616) that radiates the bulk of its RF energy into the dwelling 618. Similarly, the directional, dual-radio repeater wireless electronic device 616 may include, for example, a second coverage range 626 (e.g., corresponding to a second opposite-facing transceiver in the directional, dual-radio repeater wireless electronic device 616) that radiates the bulk of its RF energy toward the access point electronic device 622. As illustrated, the overlap and interference illustrated by, for example, the coverage range 614 in FIG. 6A is markedly reduced, as there is less possibility for interference utilizing the presently disclosed techniques.

Figure 7A:
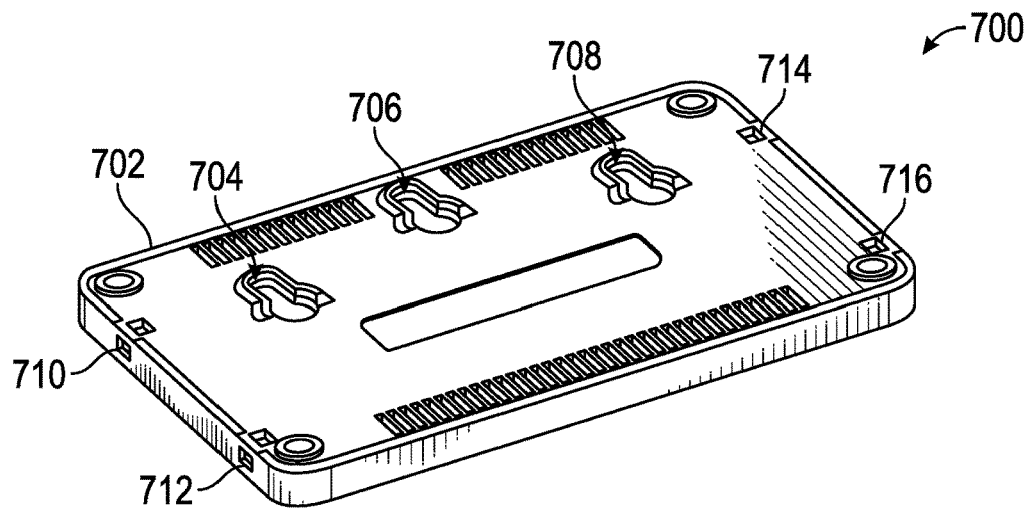
FIGS. 7A, 7B, and 7C is a schematic diagram illustrating a mounting component of a wireless electronic device, in accordance with the present embodiments.
Figure 7B:
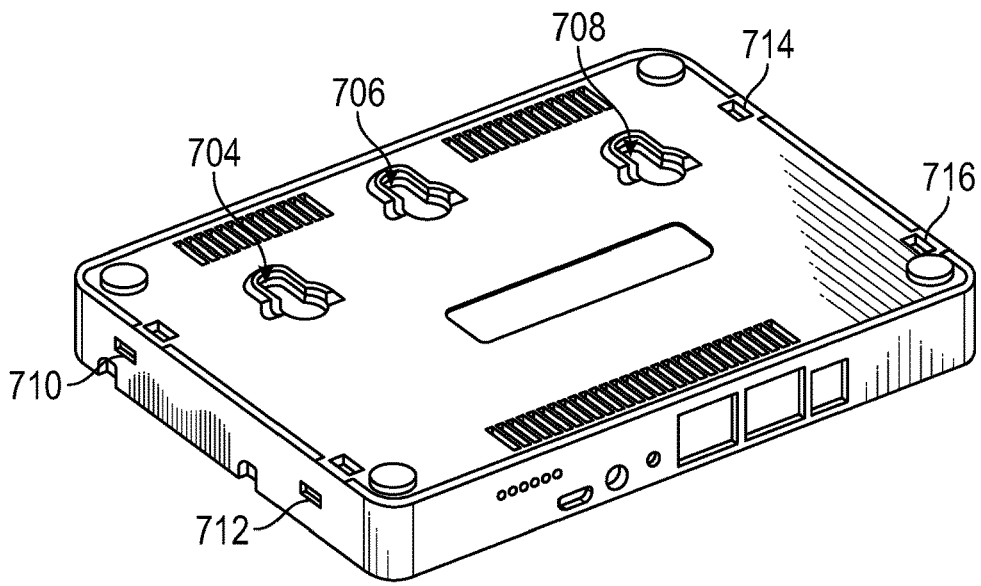
Figure 7C:
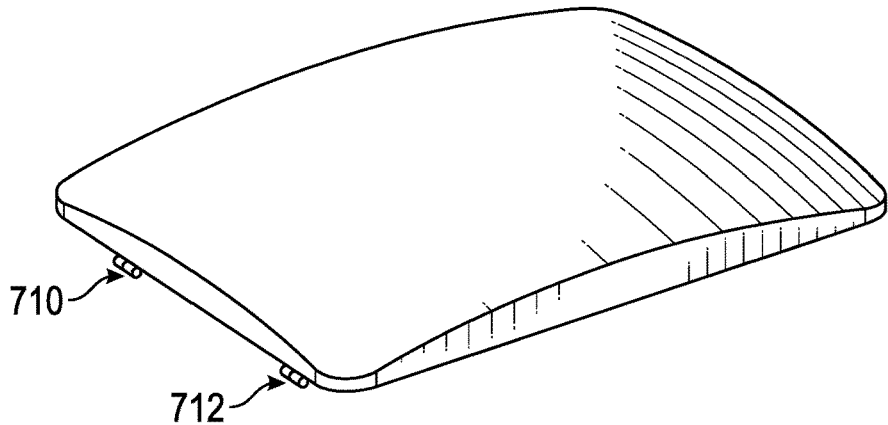

In certain embodiments, a dual-radio repeater wireless electronic device as described herein may also include a mounting component (e.g., chassis) useful in allowing, for example, the dual-radio repeater wireless electronic device to be vertically mounted on either side of the dual-radio repeater wireless electronic device. For example, referring now to FIGS. 7A, 7B, and 7C, a mounting component 700 may include mounting holes 702, 704, 706, and 708 on opposite sides of the mounting mechanism 700. In some embodiments, the mounting mechanism 700 may include 3 or more individual components. For example, FIG. 7A illustrates a face component of the mounting mechanism 700. The face component of FIG. 7A may attach, for example, to a bottom side component (FIG. 7B) of the mounting component 700 via mounts 710, 712, 714, and 716. FIG. 7C illustrates a cover component that may be attached to either the face component of FIG. 7A or the bottom side component of FIG. 7B via one or more mounts (e.g., mounts 710 and 712). In other embodiments, the mounting component 700 may include utilizing any of various techniques to vertically mount the dual-radio repeater wireless electronic device, including, for example, adhesive mounting components, Velcro™ mounting components, magnetic mounting components, suspension mounting components, and so forth.

Figure 8:
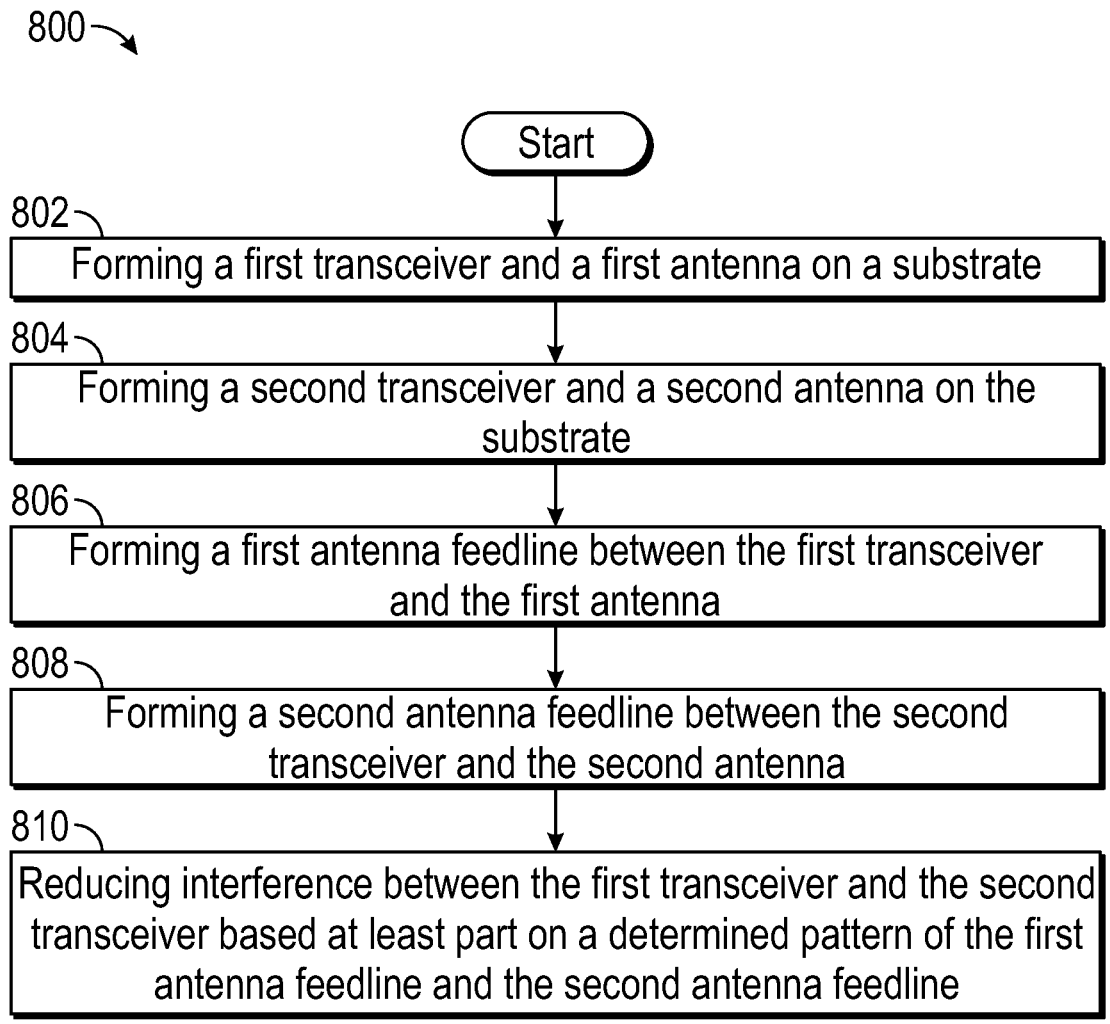
FIG. 8 is a flow diagram of a method of providing a directional dual-radio repeater wireless electronic device, in accordance with the present embodiments.

Turning now to FIG. 8, which illustrates is a flow diagram of a method 800 of forming and providing a directional, dual-radio repeater wireless electronic device, in accordance with the present embodiments. In some embodiments, the method 800 may illustrate the manufacture or formation of, for example, the dual-radio repeater wireless electronic device discussed above with respect to FIG. 2, FIGS. 3A and 3B, or FIG. 4, for example. The method 800 may begin at block 802 with forming a first transceiver (e.g., 2.4 GHz transceiver 406) and a first antenna on a substrate (e.g., substrate 402). The method 800 may continue at block 804 with forming a second transceiver (5.8 GHz transceiver 404) on the substrate (e.g., substrate 402). The method 800 may then continue at block 806 forming a first antenna feedline (e.g., antenna feedlines 420 and 422) between the first transceiver (e.g., 2.4 GHz transceiver 406) and the first antenna.

The method 800 may then continue at block 808 forming a second antenna feedline (e.g., antenna feedlines 412 and 414) between the second transceiver (5.8 GHz transceiver 404) and the second antenna. The method 800 may then conclude at block 810 with reducing interference between the first transceiver (e.g., 2.4 GHz transceiver 406) and the second transceiver (5.8 GHz transceiver 404) based at least in part on a determined trace pattern of the first antenna feedline (e.g., antenna feedlines 420 and 422) and the second antenna feedline (e.g., antenna feedlines 412 and 414).

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A wireless electronic device, comprising:
a first antenna; a first transceiver, operatively coupled to the first antenna, and configured to receive and transmit data signals of a wireless communications network in a first frequency band, the first antenna positioned to receive and transmit in a first direction; a second antenna; a second transceiver, operatively coupled to the second antenna and the first transceiver, and configured to receive and transmit data signals of the wireless communications network in a second frequency band, the second antenna positioned to receive and transmit in a second direction being opposite to the first direction, wherein the first direction and the second direction are radiation pattern directions that are separated by approximately 180°; a first antenna feedline disposed between the first transceiver and the first antenna and configured to electrically couple the first transceiver to the first antenna, wherein the first antenna feedline is disposed according to a first determined pattern; and a second antenna feedline disposed between the second transceiver and the second antenna and configured to electrically couple the second transceiver to the second antenna, wherein the second antenna feedline is disposed according to a second determined pattern, wherein the first determined pattern is different than the second determined pattern, wherein the first determined pattern is a looping pattern and the second determined pattern is a sloping pattern.

2. The wireless electronic device of claim 1, wherein the wireless communications network comprises a Wireless Fidelity (Wi-Fi™) communications network.

3. The wireless electronic device of claim 1, wherein the first transceiver and the second transceiver are configured to receive and transmit the data signals via multiple input multiple output (MIMO) antennas, the MIMO antennas comprising the first antenna and the second antenna.

4. The wireless internee connectivity device of claim 1, wherein the first frequency band comprises a frequency band of approximately 2.4 gigahertz (GHz).

5. The wireless electronic device of claim 1, wherein the second frequency band comprises a frequency band of approximately 5.8 gigahertz (GHz).

6. The wireless electronic device of claim 1, wherein the first antenna comprises a directional antenna, and wherein the second antenna comprises a directional antenna.

7. The wireless electronic device of claim 1, comprising a mounting component securing at least a portion of the wireless electronic device, the mounting component configured to allow the wireless electronic device to be vertically mounted on either side thereof.

8. A method of providing a wireless electronic device, comprising: disposing a first antenna on a first end portion of a printed circuit board (PCB), the first antenna configured to direct signals of a first frequency band in a first direction; disposing a first transceiver, electrically coupled to the first antenna, on the PCB, the first transceiver configured to receive and transmit the signals of the first frequency band via the first antenna; disposing a first antenna feedline between the first transceiver and the first antenna and configured to electrically couple the first transceiver to the first antenna, wherein the first antenna feedline is disposed according to a first determined pattern; disposing a second antenna on a second end portion of the PCB, the second end portion being different than and on an opposing side of the wireless connectivity device to the first end portion, the second antenna configured to direct signals of a second frequency band in a second direction being opposite the first direction; disposing a second transceiver on the PCB, the second transceiver configured to receive and transmit the signals of the second frequency band via the second antenna; and disposing a second antenna feedline between the second transceiver and the second antenna and configured to electrically couple the second transceiver to the second antenna, wherein the second antenna feedline is disposed according to a second determined pattern, wherein the first determined pattern is different than the second determined pattern, wherein the first determined pattern is a looping pattern and the second determined pattern is a sloping pattern.

9. The method of claim 8, Therein the first transceiver is configured to receive and transmit signals in a 2.4 gigahertz (GHz) frequency band as the first frequency band.

10. The method of claim 8, wherein the second transceiver is configured to receive and transmit signals in a 5.8 gigahertz (GHz) frequency band as the second frequency band.

11. The method of claim 10, wherein the first direction and the second direction are separated by approximately 180°.

12. A wireless repeater electronic device, comprising: a first directional antenna; a first transceiver, operatively coupled to the first directional antenna, and configured to receive and transmit Wireless Fidelity (Wi-Fi™) signals in a first frequency band, wherein the first directional antenna is positioned with respect to a first end portion of the wireless repeater electronic device to receive and transmit Wi-Fi™ signals in a first direction; a second directional antenna; a second transceiver, operatively coupled to the second directional antenna and the first transceiver, and configured to receive and transmit Wi-Fi™ signals in a second frequency band, wherein the second directional antenna is positioned with respect to a second end portion of the wireless repeater electronic device to receive and transmit Wi-Fi™ signals in a second direction being opposite to the first direction, wherein the first direction and the second direction are radiation pattern directions that are separated by approximately 180°; a first antenna feedline disposed between the first transceiver and the first antenna and configured to electrically couple the first transceiver to the first antenna, wherein the first antenna feedline is disposed according to a first determined pattern; and a second antenna feedline disposed between the second transceiver and the second antenna and configured to electrically couple the second transceiver to the second antenna, wherein the second antenna feedline is disposed according to a second determined pattern, wherein the first determined pattern is different than the second determined pattern, wherein the first determined pattern is a looping pattern and the second determined pattern is a sloping pattern.

13. The wireless repeater electronic device of claim 12, wherein the first directional antenna and the second directional antenna comprise multiple input multiple output (MIMO) antennas.

14. The wireless repeater electronic device of claim 12, wherein the first frequency band comprises a frequency band of approximately 2.4 gigahertz (GHz).

15. The wireless repeater electronic device of claim 12, wherein the second frequency band comprises a frequency band of approximately 5.8 gigahertz (GHz).

16. The wireless repeater electronic device of claim 12, comprising a mounting component securing at least a portion of the wireless repeater electronic device, the mounting including one or more openings on either side of the mounting component and configured to allow the wireless repeater electronic device to be vertically mounted on either side of thereof.

* * * * *